United States Patent Office

2,906,623
Patented Sept. 29, 1959

---

2,906,623

INHIBITING PRECIPITATION IN MALT BEVERAGES

Philip P. Gray, New York, and Irwin Stone, Eastchester, N.Y., assignors to Baxter Laboratories, Inc., a corporation of Delaware No Drawing. Continuation of application Serial No. 587,446, May 28, 1956. This application February 21, 1958, Serial No. 716,524

7 Claims. (Cl. 99—48)

This invention relates to an improved process for inhibiting the formation of calcium oxalate in malt beverages, and for the prevention of hazes and sediments due to said calcium oxalate. Improved physical characteristics and an increased aesthetic appeal are further improvements that result from the invention.

Malt beverages such as beers and ales are widely distributed in packaged form, that is, in glass bottles and tin cans. This packaging and wide distribution of the beverage makes it necessary to have a beverage able to withstand the adverse conditions of both high and low temperatures, vibration, exposure to light, traces of certain metals and anions, and other factors that affect its stability and shelf-life. The beverage must reach the consumer in a brilliant condition with unchanged flavor and the ability to remain clear and free of sediments when subjected to variable storage conditions and to chilling before consumption.

Briefly, the brewing process comprises the treatment of an aqueous suspension of malt and other starchy materials under certain definite temperature conditions to partially convert the aqueous starch suspension into a solution of fermentable sugars. This solution is filtered off from the husks and other insoluble matter of the malt. The sugary solution is boiled with hops and then cooled. The cooled liquor is treated with yeast and subjected to a slow low-temperature fermentation. The fermented liquor after partial clarification by settling and removal of the yeast is stored cold and treated with chillproofing enzymes. During this and further processing, the beer may be subjected to one or more filtrations to produce a sparkingly brilliant liquid. This highly clarified, sparklingly clear beer is then packaged and the package is usually subjected to pasteurization before distribution to the consumer. Emphasis is placed on the production of a beverage that is sparklingly clear because the present day consumer demands this type of beverage. Beverages which are not perfectly brilliant and clear or which contain even slight traces of haze or sediments are unacceptable to the consumer.

The use of chillproofing enzymes during the beer processing is a step commonly employed to prevent the formation of certain types of protein hazes due to the insolubility of various high molecular weight protein complexes at low temperatures.

There are other types of haze formations which can develop in beer besides the protein type of chillhaze. Such types are not amenable to the treatment by proteolytic enzymes. One such type is a haze or sedimentation formed by the gradual precipitation of calcium oxalate. This invention is specifically concerned with the inhibition of the formation of calcium oxalate microcrystals and hazes.

During the preparation of the beer oxalic acid may enter the liquors during mashing since oxalic acid is a normal trace constituent of the malt. The use of hops during kettle boiling may introduce additional quantities. It is possible that further traces may be formed as a result of the metabolism of the yeast during fermentation. Since calcium ion is also always present in relatively considerable amounts, generally the bulk of the oxalic acid is precipitated as the insoluble calcium oxalate during fermentation and is separated from the beer along with the settled yeast. Inasmuch as calcium oxalate has a slight solubility in beer and the precipitation of calcium oxalate at this point may be incomplete, variable amounts of the oxalate ion may be left in solution depending upon certain conditions incident to the particular brew. This soluble oxalic acid will then be carried through into the finished beverage and may serve as a possible source of further precipitation. Whether or not such precipitation can occur in the finished packaged beverage is dependent not only on the conditions under which the package is subsequently handled and held in the trade but on such processing factors prior to packaging as cellar storage conditions and duration, calcium as well as oxalate levels, and stage at which both calcium and oxalate may have entered the product.

The finished beverage after packaging is subjected to a wide variety of storage conditions and time periods before consumption. This soluble oxalic acid may then react with the calcium ions normally present in beer and further precipitate small amounts of calcium oxalate, forming undesirable hazes. On further standing these crystals will tend to grow forming increasing turbidities and unsightly sediments in the beer. Beers suffering from this continued precipitation of calcium oxalate are unacceptable to the consumer. Where calcium oxalate sediments are formed in the finished packaged beverage they may take a wide variety of crystalline forms. Some investigators believe under certain conditions there may be a connection between oxalate separation and the phenomenon of wild or gushing beer.

The amounts of oxalic acid which may occur in beer after precipitation of the calcium oxalate during fermentation are only at trace levels of the order of possibly 10 p.p.m. or less. However, these traces are enough to produce effects on the clarity of the beverage and form haze and sediment out of proportion to the actual amounts involved.

We have found that the treatment described below effectively inhibits the formation of the microcrystalline calcium oxalate hazes and sediments. This treatment comprises the addition to the beer, after fermentation and preferably after an initial clarification, of a small amount of a soluble amidopolyphosphate, such as may be obtained by the reaction of ammonia and phosphorus pentoxide. The amount of amidopolyphosphate required to accomplish the objective of preventing precipitation of microcrystalline calcium oxalate is very small. For the amounts of oxalic acid occurring in beer which normally may cause trouble, levels of only 10 p.p.m. or less of the soluble amidopolyphosphate are required. A preferred range is in the neighborhood of 5 p.p.m. inasmuch as excessive amounts of the amidopolyphosphate tend to produce hazes in beer on their own account.

An amidopolyphosphate which has been found suitable is the product formed by reacting anhydrous ammonia with phosphorus pentoxide at temperatures of above 150° C. to produce a complex nitrogen-phosphorus-oxygen-containing material having possibly a cyclic structure. Methods for the preparation of these materials are described in U.S. Patent No. 2,122,122, issued to Willard H. Woodstock. Products of this type are available commercially and may be obtained from Victor Chemical Company, Chicago, Illinois, under the name "Victamide," which is the trade name for an ammonium salt of an amidopolyphosphate.

The addition of this small amount of an amidopolyphosphate effectively inhibits the crystallization of the calcium oxalate and prevents haze formation or precipitation from this source. The amidopolyphosphate may be added any time after fermentation but is preferably added while the beer is being transferred from the fermenter to the storage tanks or just after the first filtration prior to the final polishing filtration. A convenient mode of addition is to prepare a concentrated solution of the material in water and pump it into the beer through a proportioning device while the beer is being moved during processing.

Thus, by way of example, the amidopolyphosphate composition of U.S. Patent No. 2,122,122 may be added to beer in the amount of about 5 parts per million by adding a concentrated solution of the amidopolyphosphate in water to the beer by means of a proportioning device as it is being transferred to the final polishing filtration.

The addition of the soluble amidopolyphosphate to the beer at these trace levels has no effect on the taste or color of the beer, nor any adverse action on the chillproofing enzymes. The use of this material does not require any other change in the normal processing of the beer as now customarily conducted.

This application is a continuation of our application Serial No. 587,446, filed May 28, 1956, now abandoned.

We claim:

1. Process of inhibiting the precipitation of calcium salts in malt beverages containing the same which comprises the addition of an amidopolyphosphate to the malt beverage.

2. Process of inhibiting the precipitation of calcium oxalate in malt beverages which comprises the addition of an amidopolyphosphate to the malt beverage.

3. Process of inhibiting the precipitation of calcium oxalate in malt beverages which comprises the addition of an amidopolyphosphate in amounts of up to about 10 parts per million to the malt beverage.

4. Process of inhibiting the precipitation of calcium oxalate in malt beverages which comprises the addition of an amidopolyphosphate obtained by reacting anhydrous ammonia with phosphorus pentoxide at a temperature above 150° C. to the malt beverage.

5. Process of inhibiting the precipitation of calcium oxalate in malt beverages which comprises the addition of an amidopolyphosphate obtained by reacting anhydrous ammonia with phosphorus pentoxide at a temperature above 150° C. in amounts of up to about 10 parts per million to the malt beverage.

6. A malt beverage containing an amidopolyphosphate in an amount effective to inhibit the formation of calcium oxalate hazes.

7. A malt beverage containing an amidopolyphosphate in amounts of up to about 10 parts per million effective to inhibit the formation of calcium oxalate hazes.

References Cited in the file of this patent

UNITED STATES PATENTS 2,122,122     Woodstock     June 28, 1938